(12) United States Patent
Jarski (10) Patent No.: US 11,159,955 B1
(45) Date of Patent: Oct. 26, 2021

(54) FITTED SECTOR ANALYTICS

(71) Applicant: Verizon Patent and Licensing Inc., Basking Ridge, NJ (US)

(72) Inventor: Dean P. Jarski, Rochester Hills, MI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/901,263

(22) Filed: Jun. 15, 2020

(51) Int. Cl.
*H04W 64/00* (2009.01)
*H04W 16/18* (2009.01)
*H04W 24/02* (2009.01)

(52) U.S. Cl.
CPC ........... *H04W 16/18* (2013.01); *H04W 24/02* (2013.01); *H04W 64/003* (2013.01)

(58) Field of Classification Search
CPC ................. H04W 24/02; H04W 16/18; H04W 36/00835; H04W 84/18
See application file for complete search history.

(56) References Cited

U.S. PATENT DOCUMENTS

2015/0126204 A1* 5/2015 Rodriguez Crespo ....................... H04W 16/18 455/446
2018/0124566 A1* 5/2018 Colonna ............... H04W 4/029

\* cited by examiner

*Primary Examiner* — Michael T Vu (57) ABSTRACT

A method, a device, and a non-transitory storage medium provide a fitted sector analytics service. The service may generate sector-fitted Voronoi diagram information based on cell site Voronoi diagram information. The service may calculate geographic coordinates for each sector of a cell site based on cell site coordinates, a maximum radius value, and a direction of an antenna associated with a sector of a radio access network device.

20 Claims, 10 Drawing Sheets

FITTED SECTOR ANALYTICS

BACKGROUND

Management of a network may relate to a multitude of factors, such as architecture, provisioning, network resource modeling, fault supervision, assurance and performance management, trace management, and other types of network-related supervisory and management-related factors. Network management may include the use of various tools and analytics to identify issues, faults, and other problems.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Management of a network, such as a large-scale network, may involve understanding the interrelationship between network resources and geographic locations. For example, a radio access network (RAN), such as a Fourth Generation (4G) RAN or a Fifth Generation (5G) RAN includes various RAN devices deployed at various geographic locations. The ability to discover and solve issues may depend on understanding the interrelationship between the RAN devices (e.g., an evolved Node B (eNB), a next generation Node B (gNB), etc.) and their service areas. For example, for a Long Term Evolution (LTE) network, network management may include auditing, optimizing, and planning various LTE settings, such as physical cell identifiers (PCIs) and root sequence identifiers (RSIs), tracking area codes (TACs), inter-site distances (ISDs), and other network-related factors, such as cell interference, coverage, network performance, and so forth. According to another example, for a 5G or new radio (NR) RAN, network management may include auditing, optimizing, and planning various 5G settings, such as centralized RAN (C-RAN) and/or virtualized RAN (v-RAN), front-haul and aggregation layer design, PCIs, coverage, radio interfaces, smart antennas, and so forth.

Network modelling and tools may be used for the management of a RAN. For example, a network planning tool may be used to estimate the cell range of a RAN device. Another approach may be to use a geometric method to calculate a nominal cell range based on Voronoi diagrams (also known as Voronoi tessellations or Dirichlet tessellation) which may define a polygon representing a service (or dominance) area for every cell site. The accuracy of such an approach, however, is at a cell site level (e.g., location of the RAN device, such as an evolved Node B (eNB), a next generation Node B (gNB), or other type of RAN device). As such, accuracy of cell ranges at the cell site level may contribute to sub-optimal network planning, management, and RAN performance.

Also, the cell ranges of RAN devices across a RAN may form the basis for other network planning and management tasks, such as PCI planning, RSI planning, cell interference management, ISD planning, nearest neighbor analysis, RAN device configurations (e.g., antenna tilt, transmit power, etc.), and other types of network considerations (e.g., number and placement of RAN devices in a given area, coverage, etc.).

According to exemplary embodiments, a fitted sector analytics service is provided. According to exemplary embodiments, the fitted sector analytics service may provide sector-level accuracy of a cell range. According to an exemplary embodiment, the fitted sector analytics service may be applied to various types of RAN devices of a RAN.

According to an exemplary embodiment, the fitted sector analytics service may identify a unique location for each antenna of each cell site. According to an exemplary embodiment, the fitted sector analytics service may use a Voronoi algorithm to generate Voronoi diagram information based on the unique locations. For example, the Voronoi diagram information may include Voronoi polygon information for each unique location that indicates cell range and a geographic of the cell site. According to an exemplary embodiment, the fitted sector analytics service may calculate a maximum radius within each Voronoi polygon. All edges of the Voronoi polygon may be equidistant from the two nearest cell sites (and each intersection of edges may be equidistant from at least three nearest cell sites).

According to an exemplary embodiment, the fitted sector analytics service may calculate a sectored location that is outward from the unique location of each cell site. The sectored location may be a small distance from the unique location and along a direction of a sector of the cell site. According to an exemplary embodiment, the fitted sector analytics service may use the Voronoi algorithm to generate Voronoi diagram information based on the sectored locations of each cell site. The sectored-level polygons information associated with the cell sites may reflect estimated sector coverages.

In view of the foregoing, the fitted sector analytics service may improve the accuracy of determining cell range of a cell site by approximating the sectored-level coverage of the cell site relative to a geographic area. For example, the sector-level Voronoi diagram information may indicate a more accurate mapping between the coverages of sectors of the cell site to the geographic area at which the cell site resides. The sector-level Voronoi diagram information may include geographic coordinate information corresponding to the cell coverage of each sector of the cell site. As a result, the increased accuracy of sector-level coverage may improve the task of determining cell coverage, which is a part of RAN planning and management. Additionally, the fitted sector analytics service may calculate the sectored-level coverage relatively quickly.

The fitted sector analytics service may also improve the outcome of other RAN planning and management tasks that may be based on the calculation of cell range coverage associated with a geographic area and information that necessarily may flow therefrom. For example, the outcome of PCI planning, RSI planning, cell interference management, ISD planning, nearest neighbor analysis, RAN device configurations (e.g., antenna tilt, transmit power, etc.), and other types of network considerations (e.g., number and placement of RAN devices in a given area, coverage, etc.)

may be inherently improved at least based on the sector-level Voronoi diagram information. By way of further example, the fitted sector analytics service allows for approximation of a sector's first tier neighboring sectors that may be used in future planning for reduction in interference. Furthermore, the fitted sector analytics service may be accessed by a query, for example a geographic information system (GIS) query, to predict or determine poor or dropped call events, or other network events, within the sectors indicated by the GIS coordinates.

Figure 1:
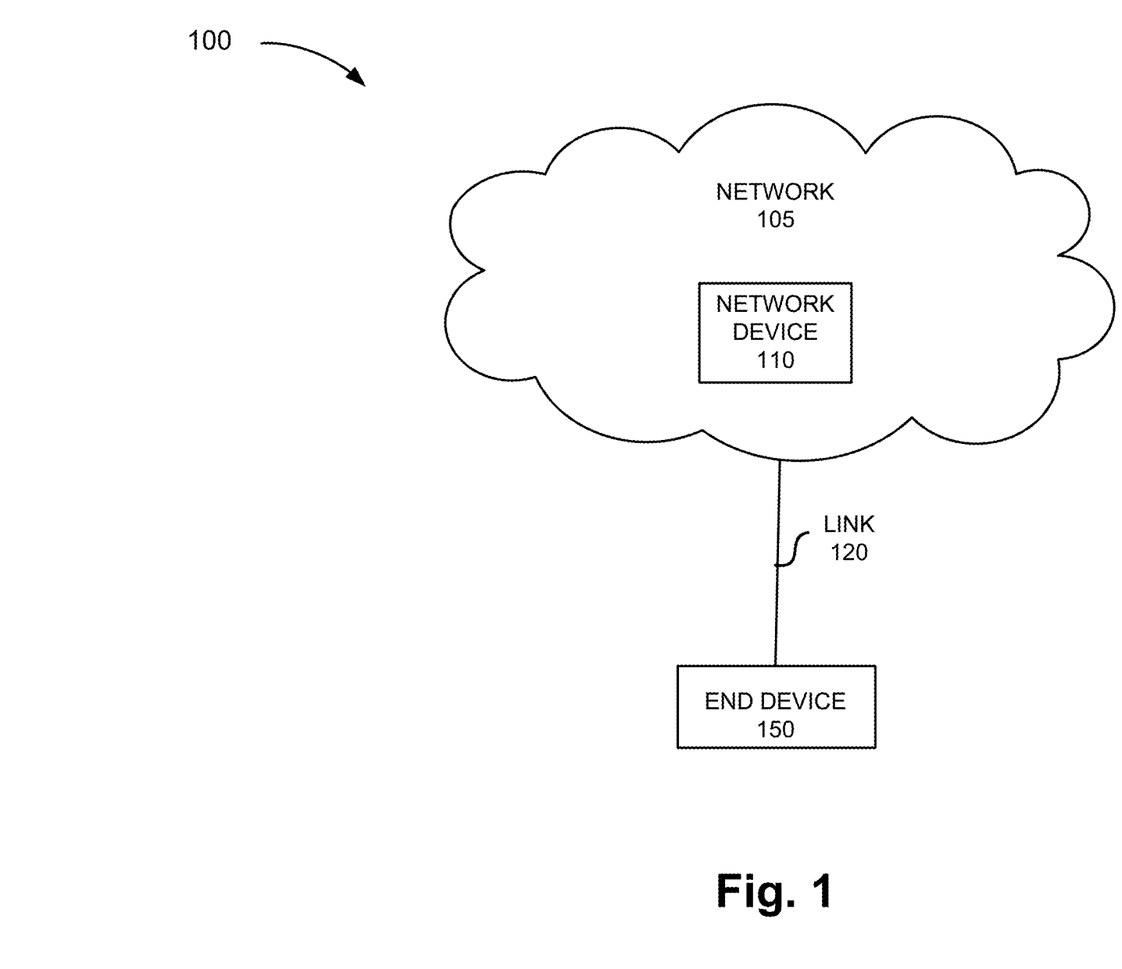
FIG. 1 is a diagram illustrating an exemplary environment in which an exemplary embodiment of a fitted sector analytics service may be implemented.

FIG. 1 is a diagram illustrating an exemplary environment 100 in which an exemplary embodiment of the fitted sector analytics service may be implemented. As illustrated, environment 100 includes a network 105, a network device 110, and an end device 150. Environment 100 includes a link 120 between network 105 and end device 150.

Network 105 includes one or multiple networks of one or multiple types. For example, network 105 may be implemented to include an access network (e.g., a RAN, a WiMax network, a Wi-Fi network, etc.), a core network, an optical network, the Internet, a mobile network, a wired network, a local area network (LAN), a service provider network, a network provider network, a private Internet Protocol (IP) network, a cloud network, a virtual network, and/or another type of network.

Network device 110 may include a device that has computational and communicative capabilities. Network device 110 may be implemented to include a computer or some other type of computational and communicative device. According to some exemplary implementations, network device 110 may be included in an operations support system (OSS), a business support system (BSS), or other type of support system. According to an exemplary embodiment, network device 110 may store and manage information that supports the fitted sector analytics service, as described herein. For example, network device 110 may store information pertaining to RAN devices of a RAN.

The RAN may be implemented to include a next generation RAN (e.g., a 5G-RAN)), another type of future generation RAN, a 4G RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), a RAN of an LTE-A Pro network, and/or another type of RAN (e.g., a legacy Third Generation (3G) RAN, etc.).

Depending on the implementation, the RAN devices of the RAN may include one or multiple types of network devices. For example, the RAN devices may include a gNB, an eNB, an evolved LTE (eLTE) eNB, a remote radio head (RRH), a baseband unit (BBU), a centralized unit (CU), a distributed unit (DU), a small cell node, a future generation wireless access device, or another type of wireless node that provides a wireless access service. According to some exemplary implementations, the RAN may include a combined functionality of multiple radio access technologies (RATs) (e.g., 4G and 5G functionality). According to various exemplary implementations, the RAN devices may include existing RAN devices (e.g., already deployed), future or prospective RAN devices (not yet deployed), or a combination thereof.

The information stored by network device 110 may include location information pertaining to a RAN device. For example, the location information may include geographic coordinates (e.g., latitude/longitude values) of a geographic coordinate system (GCS), or coordinate values associated with another type of coordinate system (e.g., a projected coordinate system (PCS), etc.). The information may also include other parameter values relating to azimuth, vertical angle, elevation, and/or other similar parameter values. Network device 110 may store other types of information relating to various components of the RAN device, such as antennas (e.g., height, geographic location, number, type, gain, transmit loss, receive loss, receive signal, fade margin (e.g., thermal, effective, etc.), and other characteristics or configurations of the RAN device. The information may also include map information. For example, the map information may include a map of a geographic area (e.g., country, state, county, city, etc.). The map information may also include an overlay of where RAN devices may be situated in a geographic area, as well as other information pertaining to the RAN and/or RAN devices.

End device 150 may include a device that has computational and communicative capabilities. End device 150 may be implemented as an end user device, a mobile device, a stationary device, a portable device, or any other type of device. By way of further example, end device 150 may be implemented as a computer or a terminal device. According to an exemplary embodiment, end device 150 includes logic that provides the fitted sector analytics service. For example, end device 150 may include software that performs an operation or a process of the fitted sector analytics service. The software may include graphical user interfaces that permit an interactive environment with a user. End device 150 may include software that permits end device 150 to query and/or retrieve the information stored by network device 110, as described herein.

A network device, such as network device 110, may be implemented according to a centralized computing architecture, a distributed computing architecture, or a cloud computing architecture (e.g., an elastic cloud, a private cloud, a public cloud, etc.). Additionally, end device 150 and/or network device 110 may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1. For example, according to other embodiments, environment 100 may not include network 105, network device 110, and link 120.

Figure 2A:
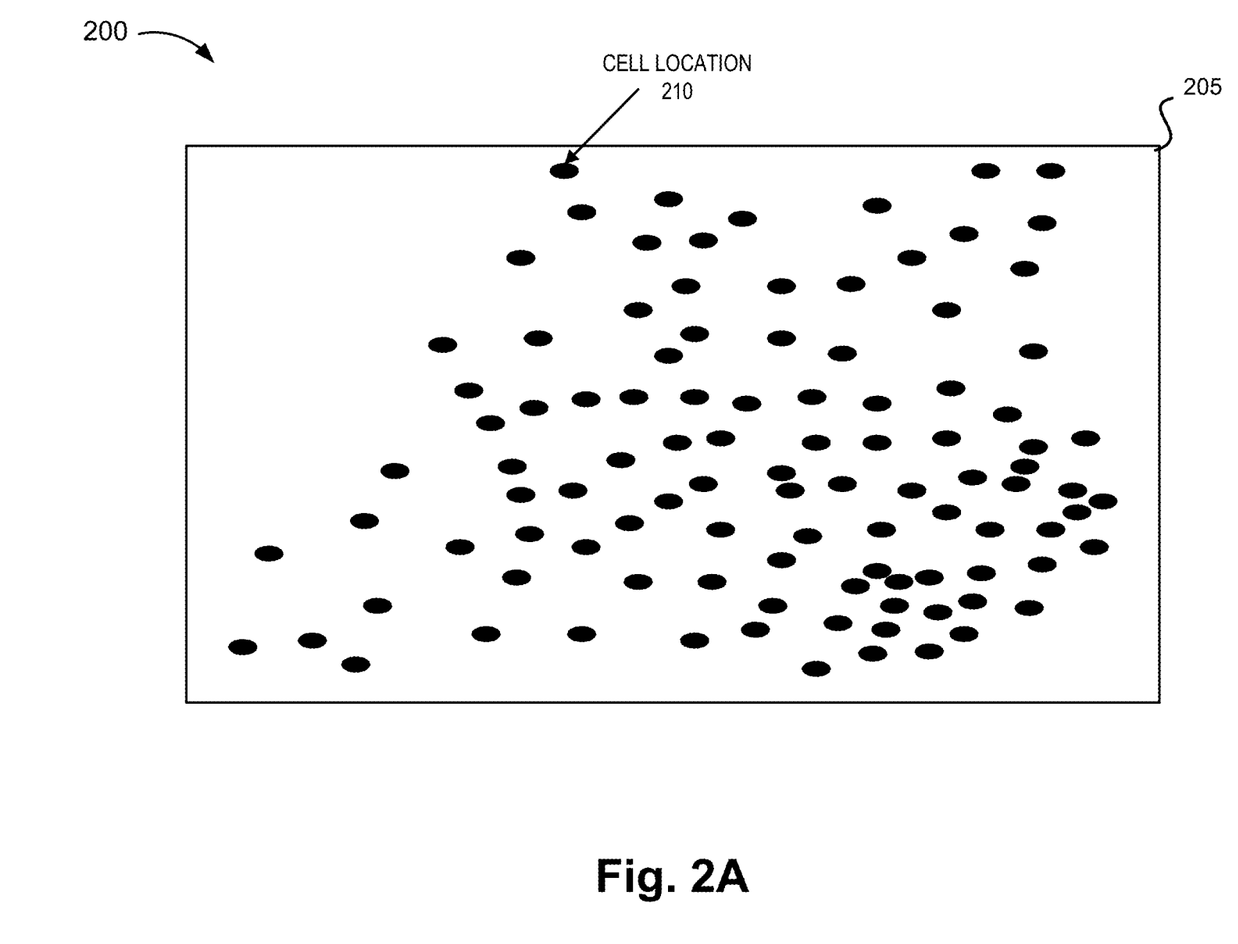
FIGS. 2A-2G are diagrams illustrating an exemplary process of the fitted sector analytics service according to an exemplary scenario.

FIGS. 2A-2G are diagrams illustrating an exemplary process 200 of the fitted sector analytics service. Referring to FIG. 2A, according to an exemplary scenario, assume a user (not illustrated) is operating end device 150 and obtains information from network device 110 of a geographic area 205. Based on the obtained information, end device 150 may generate information indicating cell locations 210 situated in geographic area 205.

Figure 2B:
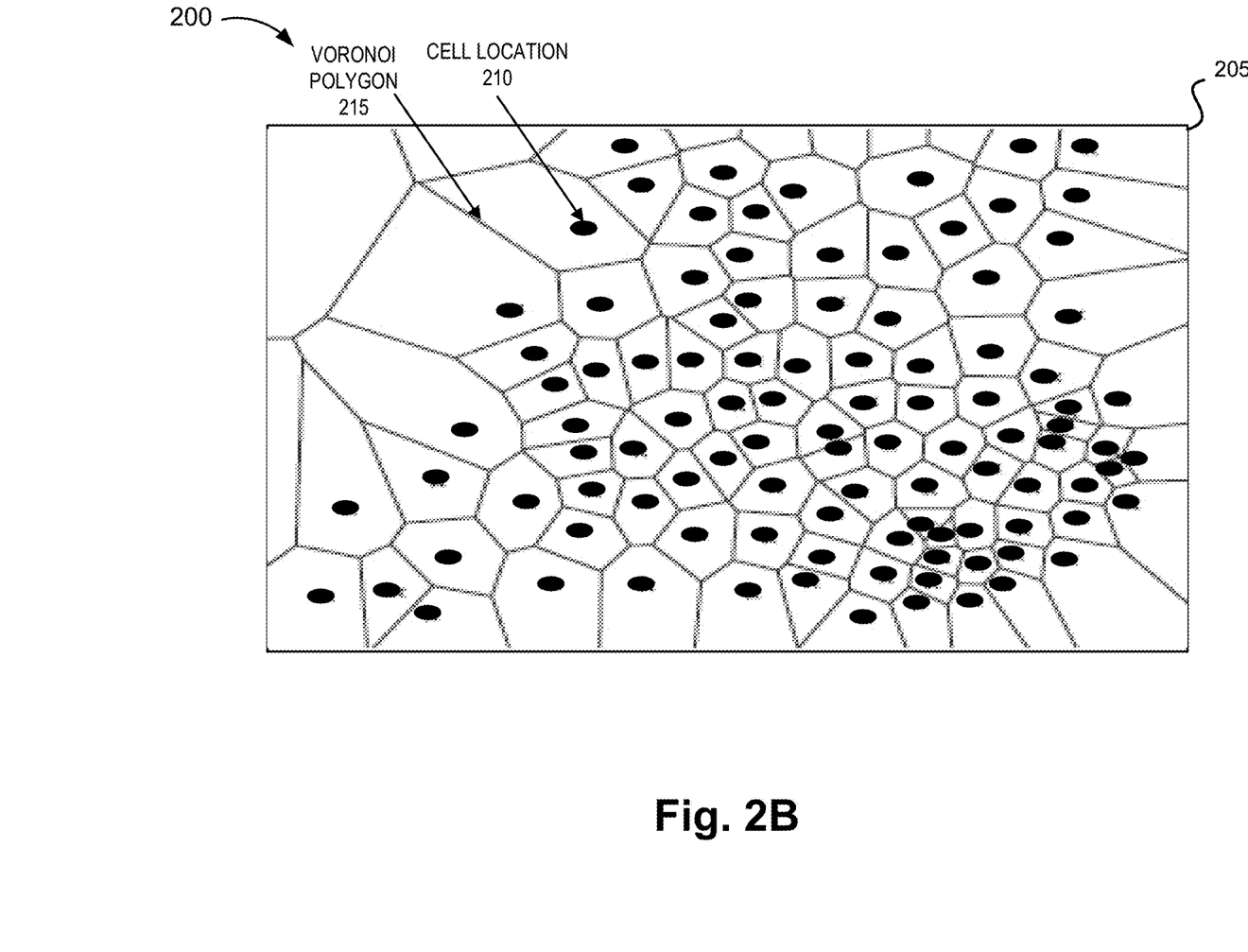

Referring to FIG. 2B, end device 150 may generate Voronoi diagram information based on the geographic coordinates associated with cell locations 210 and map information associated with geographic area 205. For example, the Voronoi diagram information may include Voronoi polygons 215 for cell locations 210. End device 150 may include logic of an algorithm that generates the Voronoi diagram information. For example, Fortune's algorithm or other well-known algorithms, a proprietary algorithm, and so forth may be implemented to generate the Voronoi diagram information.

Figure 2C:
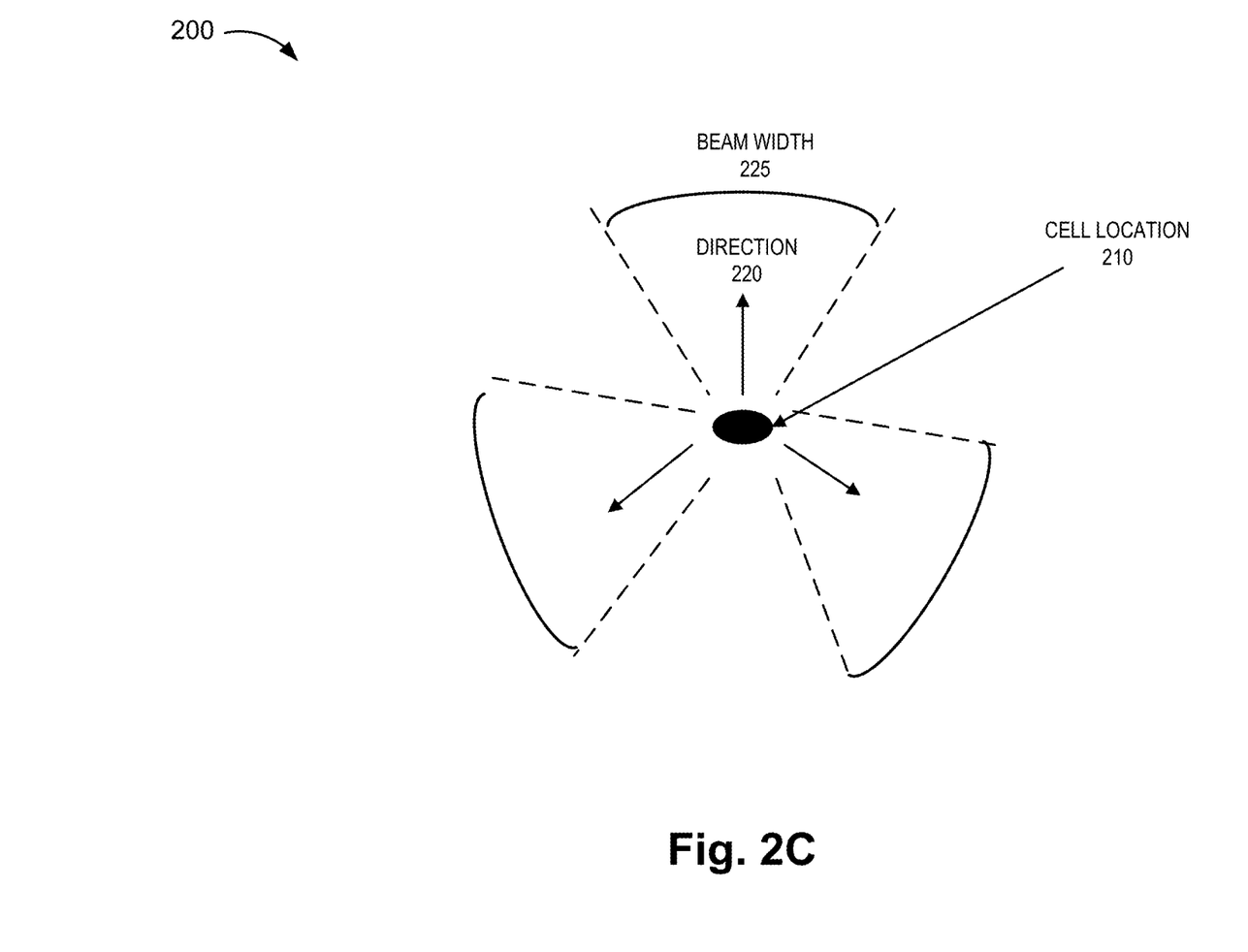
Figure 2D:
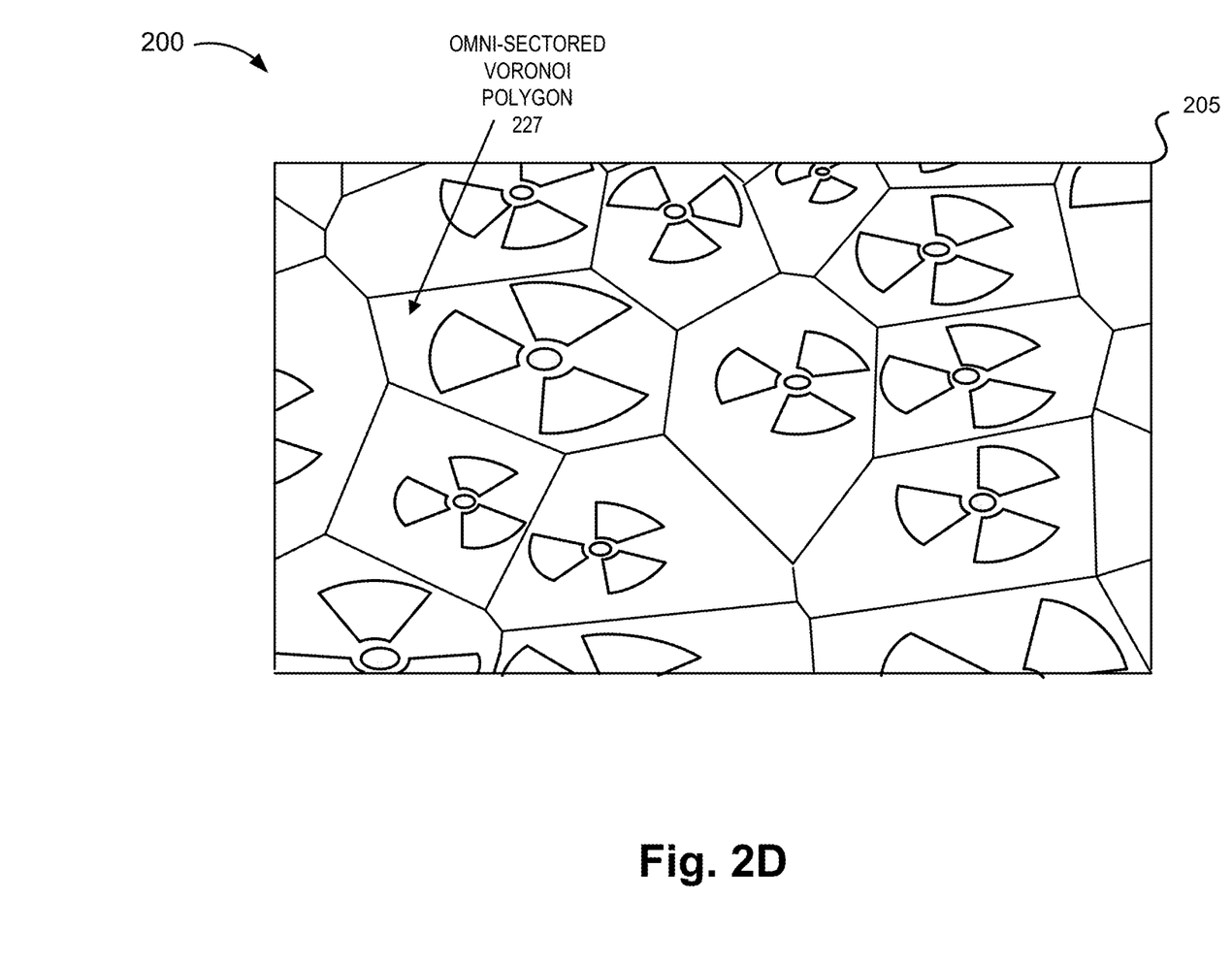

Referring to FIG. 2C, end device 150 may use the information obtained from network device 110 to account for direction and beam width of antennas of a RAN device associated with cell location 210. For example, according to this example, assume there are three sets of antennas pointing in respective directions 220 and having respective beam widths 225. According to other exemplary scenarios, the number of sets of antennas may be different (e.g., six antennas, fewer, additional, etc.). End device 150 may generate information corresponding to the Voronoi diagram depicted in FIG. 2D. For example, Voronoi polygons 227 may be omni-sectored based on the direction and beam widths of antennas of the RAN devices.

Figure 2E:
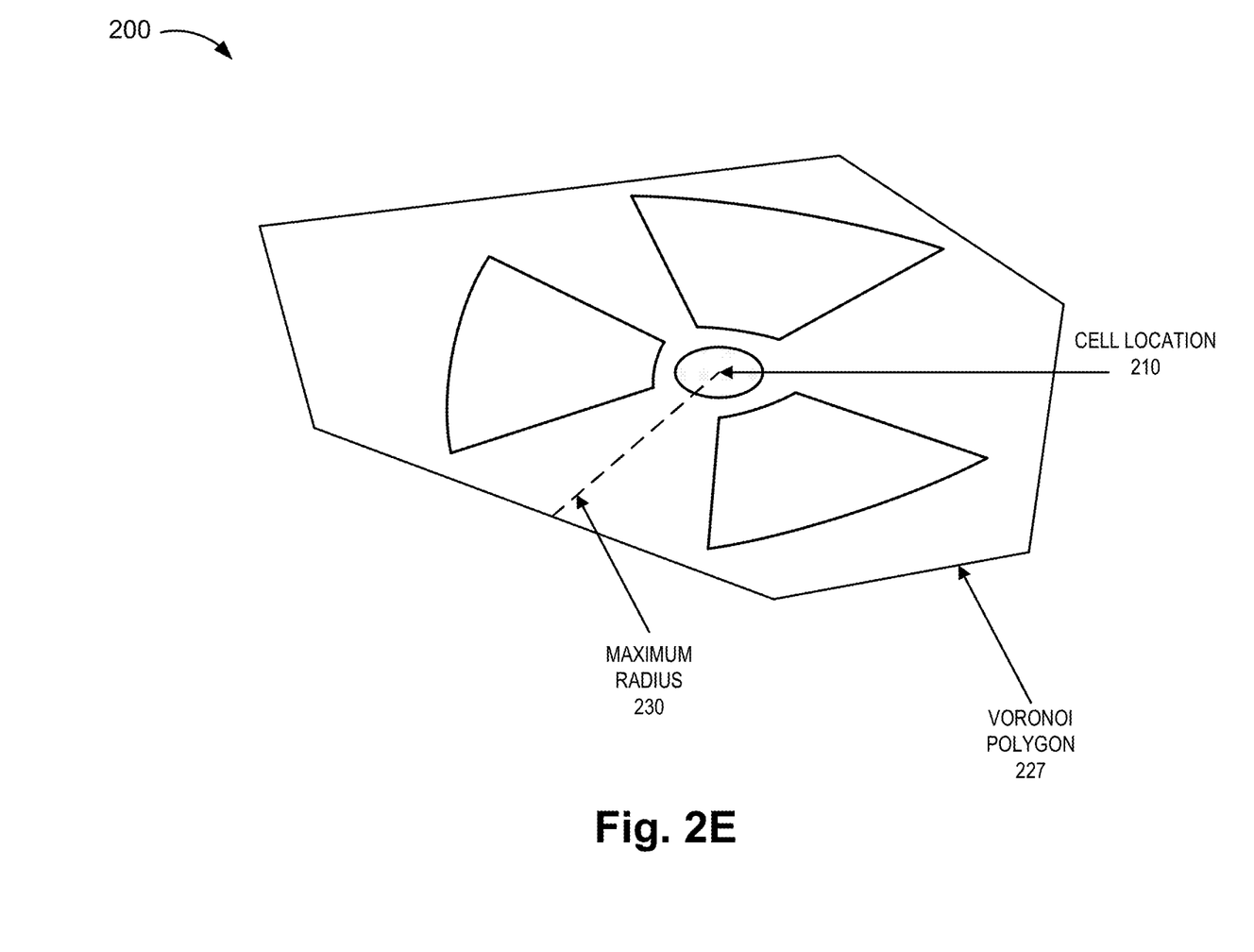

Referring to FIG. 2E, end device 150 may calculate a maximum radius 230 for each Voronoi polygon 227 based on cell location 210 and edges of Voronoi polygon 227. For example, maximum radius 230 may be a maximum distance from cell location 210 that does not extend beyond any edge of the Voronoi polygon 227.

Figure 2F:
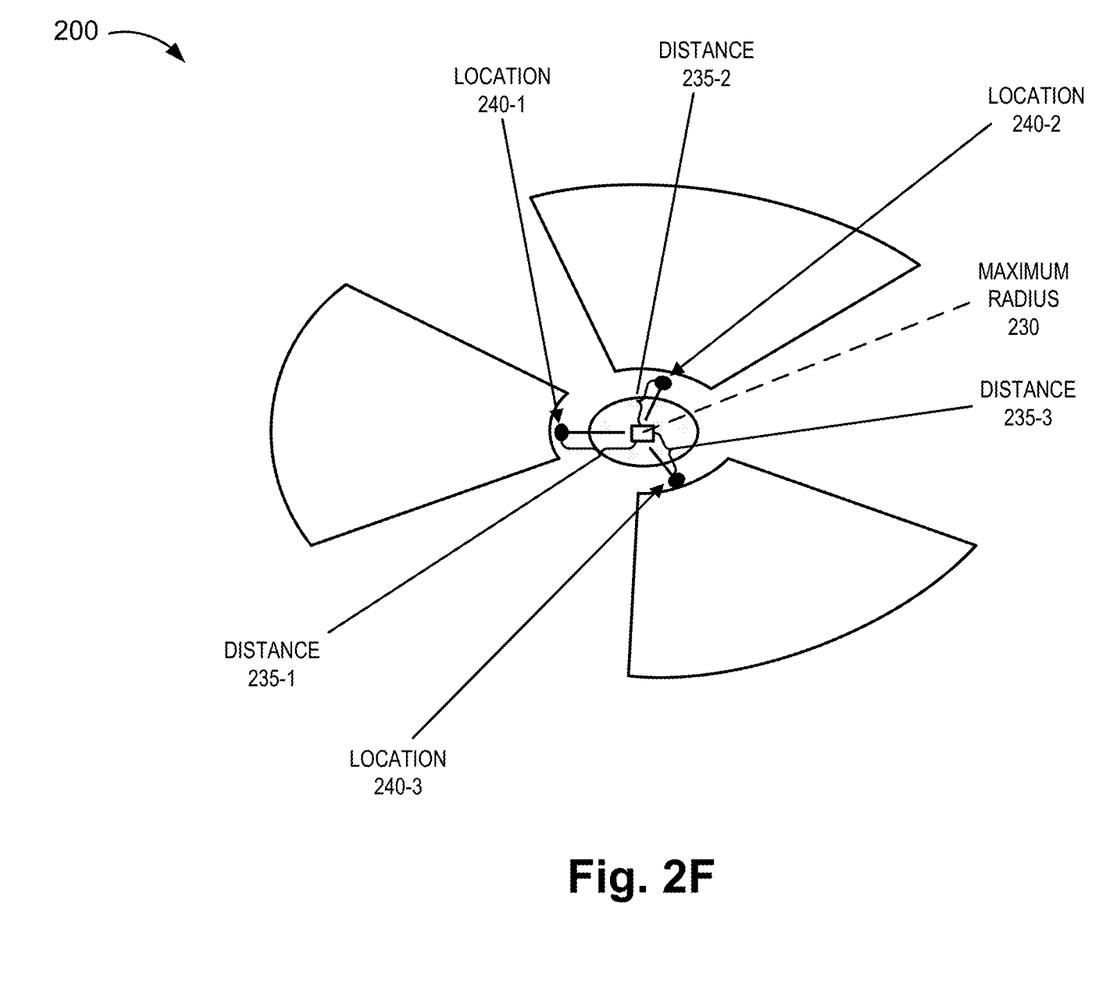

Referring to FIG. 2F, end device 150 may calculate locations for each sector of the RAN device. According to this example, end device 150 may calculate locations 240-1, 240-2, and 240-3 (also referred to as locations 240 or individually or generally as location 240). End device 150 may calculate location 240 based on cell location 210, maximum radius 230, and direction of antenna associated with the sector.

As illustrated, each of locations 240 may be a distance 235, such as distances 235-1, 235-2, and 235-3 (also referred to as distances 235 or individually or generally as distance 235) from cell location 210. According to an exemplary implementation, distances 235 may be calculated based on a percentage or scalar value of the distance value of maximum radius 230. As an example, distance 235 may be about 10% or one tenth of maximum radius 230, or another configurable value relative to maximum radius 230. With reference to distance 235, the location of antennas of the RAN device may be different from the cell site location. For example, there may be a structure (e.g., a pole, etc.) of the RAN device that supports an antenna, and the antenna may be a certain distance outward from the support structure. According to other exemplary implementations, distance 235 may be calculated based on another approach.

According to various exemplary implementations, distance 235 may be the same for each sector or not of the RAN device. For example, referring to FIG. 2F, distance 235-1 associated with location 240-1 and distance 235-3 associated with location 240-3 may be the same or different. As an example, distance 235-3 may be different from distance 235-1 due to an angle of separation between these (adjacent) sectors (e.g., antennas) or due to the sectors of a neighboring or non-neighboring cell site/RAN device.

Figure 2G:
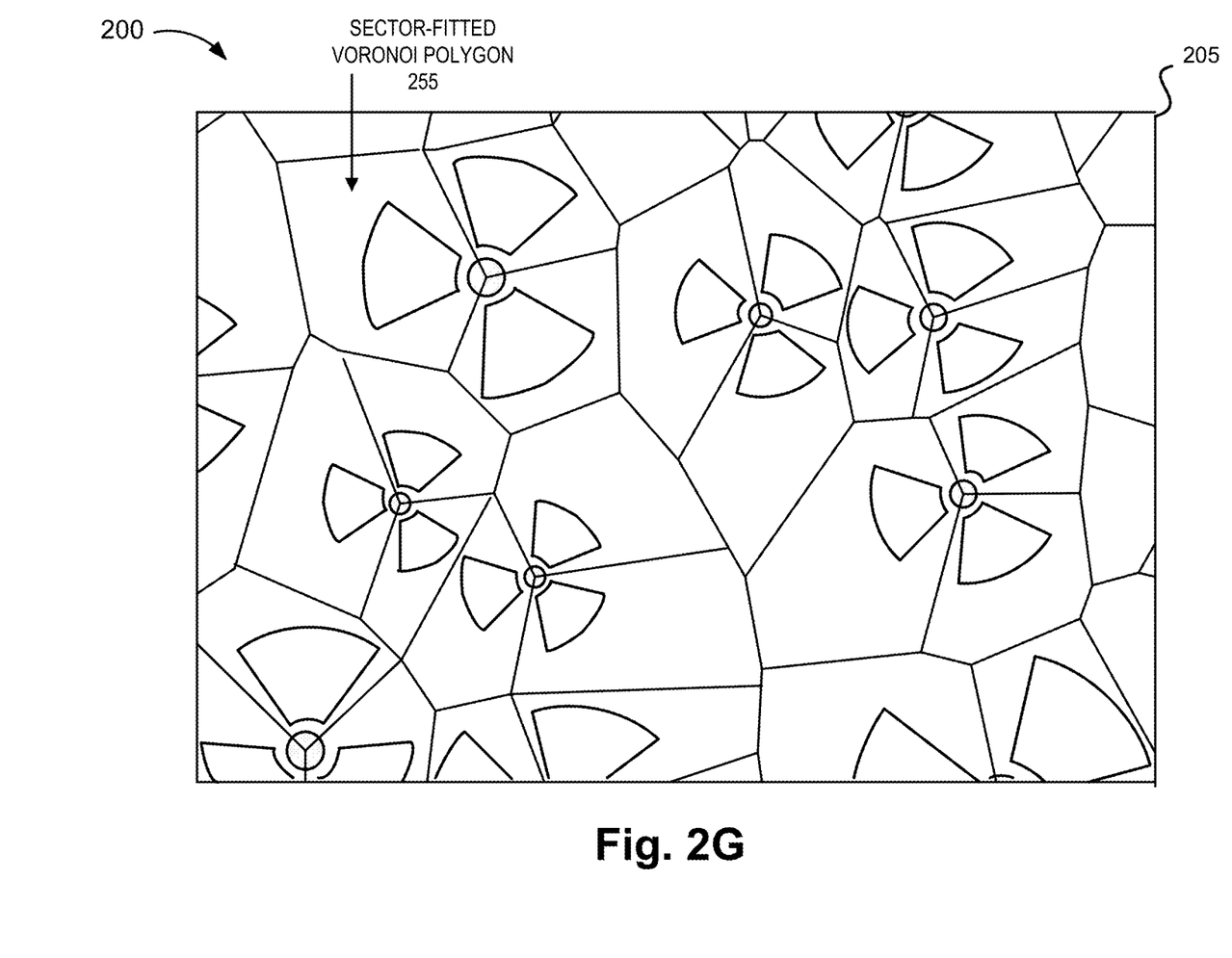

End device 150 may generate information corresponding to a Voronoi diagram based on the sectored locations 240, as depicted in FIG. 2G. For example, the Voronoi diagram may be include sector-fitted Voronoi polygons 255 associated with the sectors of RAN devices/cell sites in geographic area 205. Sector-fitted Voronoi polygons 255 may indicate sector-level cell range provided by sectors of the RAN devices in the RAN.

Although FIGS. 2A-2G illustrate an exemplary embodiment of a process of the fitted sector analytics service, according to other exemplary scenarios, the fitted sector analytics service may perform additional operations, fewer operations, and/or different operations than those illustrated and described.

Figure 3:
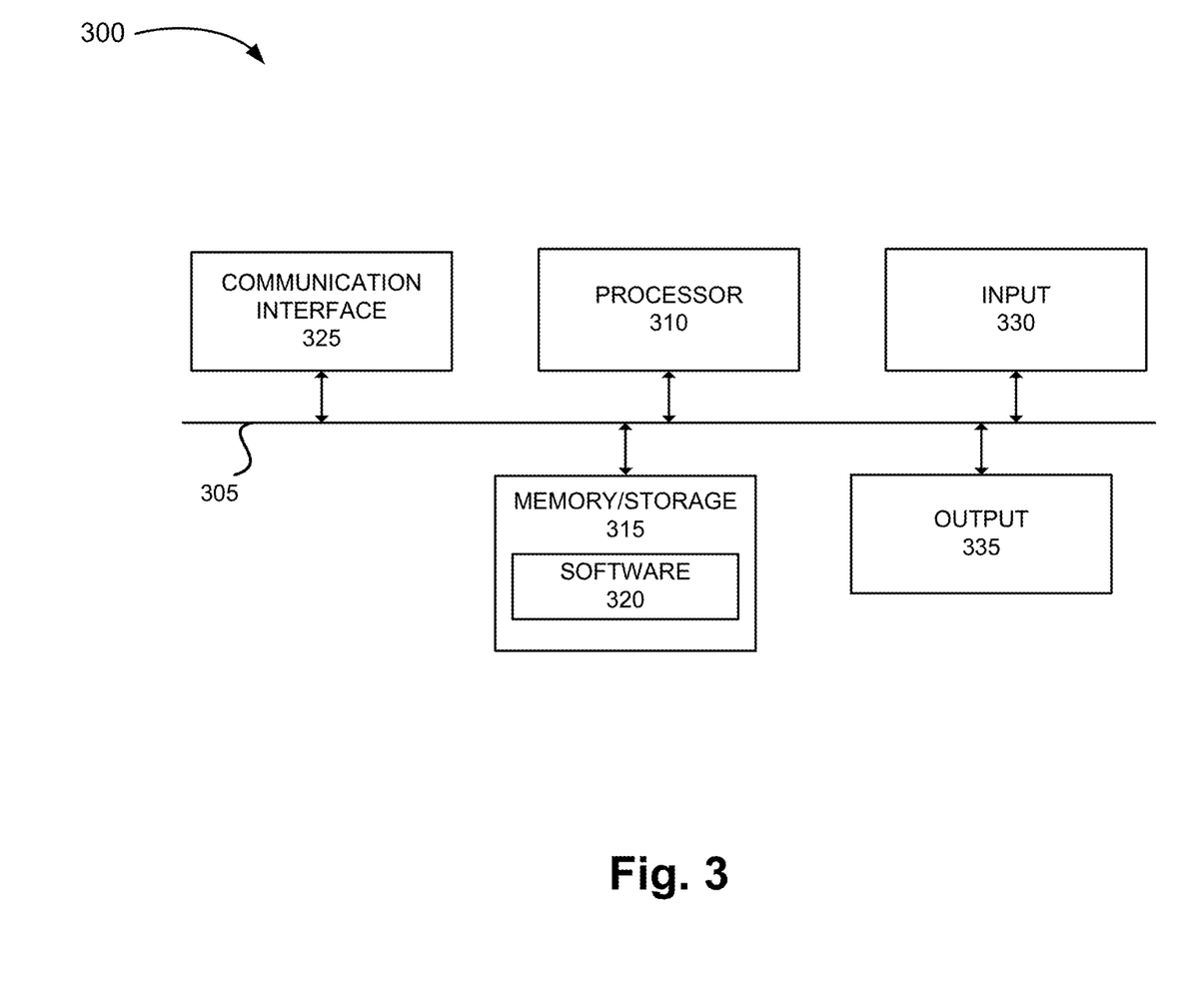
FIG. 3 is a diagram illustrating exemplary components of a device that may correspond to one or more of the devices illustrated herein.

FIG. 3 is a diagram illustrating exemplary components of a device 300 that may correspond to one or more of the devices described herein. For example, device 300 may correspond to network device 110 and end device 150, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.) and may include one or multiple memories (e.g., cache, etc.). Processor 310 may include a dedicated element (e.g., a dedicated microprocessor) and/or a non-dedicated element (e.g., a non-dedicated/shared microprocessor, etc.).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may also include firmware, middleware, microcode, hardware description language (HDL), and/or other form of instructions. As an example, with reference to network device 110, software 320 may include an application that, when executed by processor 310, manages a database or other repository that stores and manages the information, as described herein. According to another example, with reference to end device 150, software 320 may include an application that, when executed by processor 310, provides the fitted sector analytics service, as described herein.

Communication interface 325 permits device 300 to communicate with other devices, networks, systems, and/or the like. Communication interface 325 includes one or multiple interfaces of one or multiple types (e.g., optical, wireless, wired). Communication interface 325 may include one or multiple transmitters and receivers, or transceivers. Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, etc.).

The RAN device may include one or multiple antennas. The antenna may be implemented according to various configurations, such as single input single output (SISO), single input multiple output (SIMO), multiple input single output (MISO), multiple input multiple output (MIMO), massive MIMO, three dimensional (3D) beamforming (also known as full-dimensional MIMO), 2D beamforming, antenna spacing, tilt (relative to the ground), a radiation pattern, directivity, elevation, planar arrays, and so forth.

Input 330 permits an input into device 300. For example, input 330 may include a keyboard, a mouse, a display, a touchscreen, a touchless screen, a button (e.g., a power button, a disaster recovery button, a virtual button, etc.), a switch, an input port, speech recognition logic, and/or some other type of visual, auditory, tactile, etc., input component. Output 335 permits an output from device 300. For example, output 335 may include a speaker, a display, a touchscreen, a touchless screen, a light, an output port, and/or some other type of visual, auditory, tactile, etc., output component.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
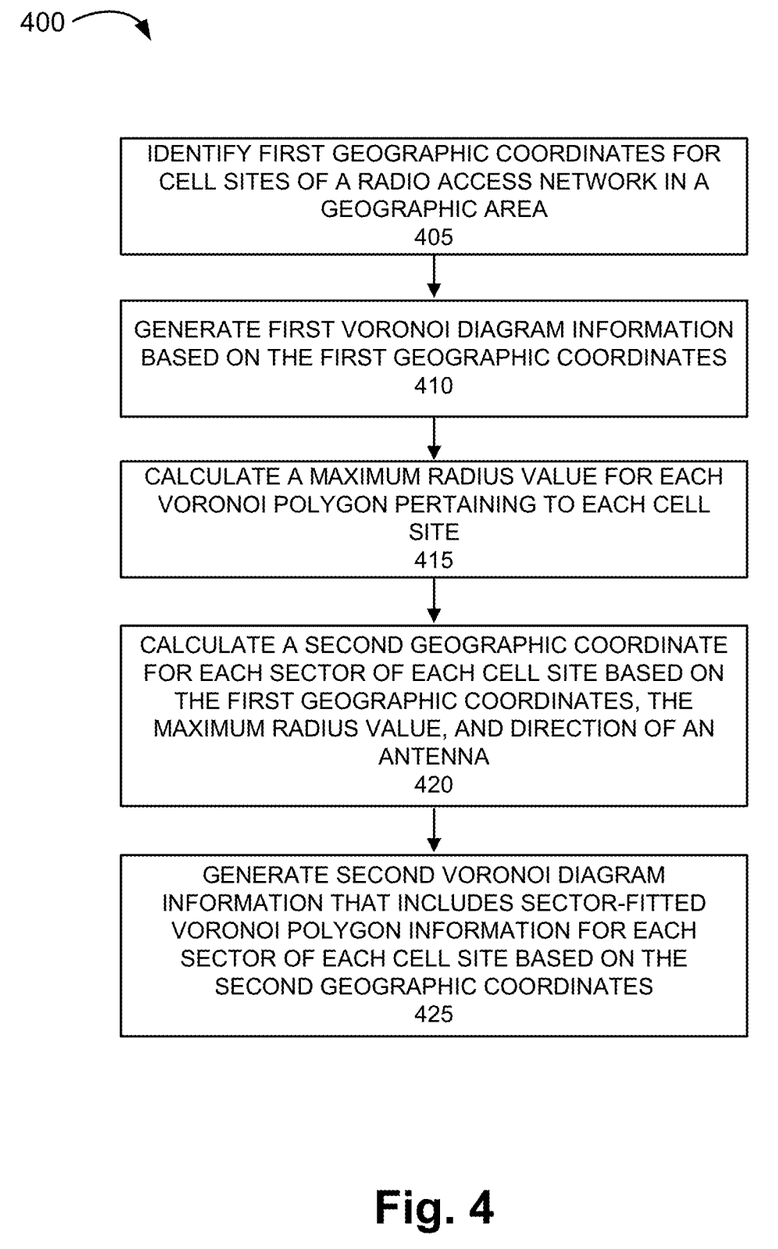
FIG. 4 is a flow diagram illustrating an exemplary process of the fitted sector analytics service.

FIG. 4 is a flow diagram illustrating an exemplary process 500 of the fitted sector analytics service. According to an exemplary embodiment, end device 150 may perform steps of process 400. For example, processor 310 may execute software 320 to perform a step illustrated in FIG. 4 and described herein. Alternatively, a step illustrated in FIG. 4 and described herein, may be performed by execution of only hardware. Further, a step may be only partially performed by the execution of software 320 or only hardware. According to other exemplary embodiments, process 400 may be performed by a network device (e.g., a server device or another type of support system device) or in combination with end device 150. For the sake of description of process 400, assume end device 150 has already obtained information from network device 110.

Referring to FIG. 4, in block 405, end device 150 may identify first geographic coordinates for cell sites of a RAN in a geographic area. The cell sites may relate to existing and/or prospective RAN devices. The first geographic coordinates may include latitude and longitude values.

In block 410, end device 150 may generate first Voronoi diagram information based on the first geographic coordinates. The first Voronoi diagram information may include Voronoi polygon information for the cell sites that indicate site level range or coverage of the RAN devices.

In block 415, end device 150 may generate a maximum radius value for each Voronoi polygon pertaining to each cell site. For example, end device 150 may calculate the maximum radius value based on the first geographic coordinates and the edges of the Voronoi polygon, as described herein.

In block 420, end device 150 may calculate a second geographic coordinate for each sector of each cell site based on the first geographic coordinates, the maximum radius value, and a direction of an antenna associated with the sector. For example, end device 150 may calculate a distance and use the direction of a sector of the RAN device to determine the second geographic coordinate. According to an exemplary implementation, the distance may be calculated based on a scalar value or percentage value of the maximum radius value and information pertaining to the antenna, such as direction, and optionally other parameter values (e.g., azimuth, etc.), as described herein.

In block 425, end device 150 may generate second Voronoi diagram information based on the second coordinates. The second Voronoi diagram information may include Voronoi polygon information for sectors of the cell sites that indicate sector-level range or coverage of the RAN devices.

FIG. 4 illustrate an exemplary process 400 of the fitted sector analytics service, however, according to other embodiments, process 400 may include additional operations, fewer operations, and/or different operations than those illustrated in FIG. 4 and described herein. For example, the second Voronoi diagram information may be used to perform other tasks relating to network planning and/or network management (e.g., PCI planning, RSI planning, ISD analysis, etc.) as described herein.

The foregoing description of embodiments provides illustration but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while a series of blocks has been described with regard to the process illustrated in FIG. 4, the order of the blocks may be modified according to other embodiments. Further, non-dependent blocks may be performed in parallel. Additionally, other processes and/or operations described in this description may be modified and/or non-dependent operations may be performed in parallel.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction described in this description should be construed as critical or essential to the embodiments described herein unless explicitly described as such.

All structural and functional equivalents to the elements of the various aspects set forth in this disclosure that are known or later come to be known are expressly incorporated herein by reference and are intended to be encompassed by the claims.

What is claimed is:

1. A method comprising:
   identifying, by a device, first geographic coordinates for each cell site of a radio access network (RAN) situated in a geographic area;
   generating, by the device, first Voronoi diagram information based on the first geographic coordinates;
   calculating, by the device, a maximum radius value for each Voronoi polygon pertaining to each cell site;
   calculating, by the device, a second geographic coordinate for each sector associated with each cell site based on the first geographic coordinates and the maximum radius value of each cell site, and a direction of an antenna associated with each sector; and
   generating, by the device, second Voronoi diagram information based on second geographic coordinates, wherein the second Voronoi diagram information includes sector-level Voronoi polygon information for each sector of each cell site.

2. The method of claim 1, further comprising:
   using, by the device, the second Voronoi diagram information to perform a network management or a network planning task pertaining to the RAN.

3. The method of claim 1, wherein calculating the second geographic coordinate further comprises:
   calculating, by the device, a distance value from the first geographic coordinates based the maximum radius value.

4. The method of claim 3, wherein the distance value is a scalar or a percentage of the maximum radius value.

5. The method of claim 3, wherein the distance value is the same for each sector associated with a cell site of the RAN.

6. The method of claim 3, wherein the distance value is different between two or more sectors associated with a cell site of the RAN.

7. The method of claim 1, wherein cells sites of the RAN relate to locations of at least one of evolved Node Bs, evolved Long Term Evolution (eLTE) Node Bs, or next generation Node Bs.

8. The method of claim 1, wherein cell sites of the RAN relate to deployed RAN devices and prospectively deployed RAN devices.

9. A device comprising:
   a processor, wherein the processor is configured to:
      identify first geographic coordinates for each cell site of a radio access network (RAN) situated in a geographic area;
      generate first Voronoi diagram information based on the first geographic coordinates;
      calculate a maximum radius value for each Voronoi polygon pertaining to each cell site;
      calculate a second geographic coordinate for each sector associated with each cell site based on the first geographic coordinates and the maximum radius value of each cell site, and a direction of an antenna associated with each sector; and
      generate second Voronoi diagram information based on second geographic coordinates, wherein the second Voronoi diagram information includes sector-level Voronoi polygon information for each sector of each cell site.

10. The device of claim 9, wherein the processor is further configured to:
   use the second Voronoi diagram information to perform a network management or a network planning task pertaining to the RAN.

11. The device of claim 9, wherein, when calculating the second geographic coordinate, the processor is further configured to:
   calculate a distance value from the first geographic coordinates based the maximum radius value.

12. The device of claim 11, wherein the distance value is a scalar or a percentage of the maximum radius value.

13. The device of claim 11, wherein the distance value is the same for each sector associated with a cell site of the RAN.

14. The device of claim 11, wherein the distance value is different between two or more sectors associated with a cell site of the RAN.

15. The device of claim 9, wherein cell sites of the RAN relate to deployed RAN devices and prospectively deployed RAN devices.

16. A non-transitory, computer-readable storage medium storing instructions executable by a processor of a device, which when executed cause the device to:
   identify first geographic coordinates for each cell site of a radio access network (RAN) situated in a geographic area;
   generate first Voronoi diagram information based on the first geographic coordinates;
   calculate a maximum radius value for each Voronoi polygon pertaining to each cell site;
   calculate a second geographic coordinate for each sector associated with each cell site based on the first geographic coordinates and the maximum radius value of each cell site, and a direction of an antenna associated with each sector; and
   generate second Voronoi diagram information based on second geographic coordinates, wherein the second Voronoi diagram information includes sector-level Voronoi polygon information for each sector of each cell site.

17. The non-transitory, computer-readable storage medium of claim 16, wherein cell sites of the RAN relate to deployed RAN devices and prospectively deployed RAN devices.

18. The non-transitory, computer-readable storage medium of claim 16, wherein the instructions to calculate the second geographic coordinate further comprise instructions, which when executed cause the device to:
   calculate a distance value from the first geographic coordinates based the maximum radius value.

19. The non-transitory, computer-readable storage medium of claim 18, wherein the distance value is a scalar or a percentage of the maximum radius value.

20. The non-transitory, computer-readable storage medium of claim 16, wherein the instructions further comprise instructions, which when executed cause the device to:
   use the second Voronoi diagram information to perform a network management or a network planning task pertaining to the RAN.

* * * * *